(12) United States Patent
Russ (10) Patent No.: US 9,045,983 B2
(45) Date of Patent: Jun. 2, 2015

(54) TURBINE YOKEPLATE FLYWEIGHTS TO IMPROVE RAT STARTUP

(75) Inventor: David Everett Russ, Rockford, IL (US)

(73) Assignee: Hamilton Sundstrand Corporation, Windsor Locks, CT (US)

(*) Notice: Subject to any disclaimer, the term of this patent is extended or adjusted under 35 U.S.C. 154(b) by 1262 days.

(21) Appl. No.: 12/907,728

(22) Filed: Oct. 19, 2010

(65) Prior Publication Data
US 2012/0093653 A1 Apr. 19, 2012

(51) Int. Cl.
F01D 7/02 (2006.01)
B64D 41/00 (2006.01)

(52) U.S. Cl.
CPC ............... *F01D 7/02* (2013.01); *B64D 41/007* (2013.01); *F05D 2220/34* (2013.01); *F05D 2260/52* (2013.01); *F05D 2260/56* (2013.01); *F05D 2260/71* (2013.01); *F05D 2260/77* (2013.01); *F05D 2260/79* (2013.01); *Y02T 50/671* (2013.01); *Y02T 50/673* (2013.01)

(58) Field of Classification Search
CPC ..... F01D 7/02; B64D 41/007; F05D 2220/34; F05D 2260/52; F05D 2260/56; F05D 2260/71; F05D 2260/77; F05D 2260/79
USPC ......... 416/44, 46, 50–53, 135–140, 151, 153, 416/156, 157 R
See application file for complete search history.

(56) References Cited

U.S. PATENT DOCUMENTS

| 3,635,584 | A | | 1/1972 | Chilman et al. |
| 4,411,596 | A | * | 10/1983 | Chilman ........................ 416/51 |
| 4,743,163 | A | * | 5/1988 | Markunas et al. ............... 416/44 |
| 5,122,036 | A | | 6/1992 | Dickes et al. |
| 5,145,324 | A | | 9/1992 | Dickes et al. |
| 5,257,907 | A | | 11/1993 | Seidel |
| 5,487,645 | A | | 1/1996 | Eccles |
| 5,779,446 | A | | 7/1998 | Althof et al. |
| 7,074,010 | B2 | | 7/2006 | DeGroff et al. |

(Continued)

FOREIGN PATENT DOCUMENTS

| EP | 0713008 A1 | 5/1996 |
| EP | 0629165 B1 | 4/1999 |

(Continued)

OTHER PUBLICATIONS

International Search Report; International Application No. GB1120637.2; International Filing Date Mar. 29, 2012; Date of Mailing Apr. 3, 2012; 4 pages.

(Continued)

*Primary Examiner* — Edward Look
*Assistant Examiner* — Jesse Prager
(74) *Attorney, Agent, or Firm* — Cantor Colburn LLP (57) ABSTRACT

A turbine having a cam follower operable to control turbine blade pitch in association with a position thereof is provided and includes an axially movable plate, a rotational and axially movable flyweight and a system operably coupled to the plate and the flyweight whereby, at low RPMs, the system prevents flyweight rotation such that the plate and the flyweight position the cam follower at a first position, at medium RPMs, the system permits flyweight rotation such that the plate and the flyweight position the cam follower at a second position, and, at high RPMs, the system prevents further flyweight rotation and permits initial axial movement of the plate and the flyweight such that the plate and the flyweight position the cam follower at a third position.

2 Claims, 7 Drawing Sheets

(56) References Cited

U.S. PATENT DOCUMENTS

| | | |
|---|---|---|
| 7,296,970 B2 | 11/2007 | Bannon et al. |
| 7,306,430 B2 | 12/2007 | Russ |
| 7,416,392 B2 | 8/2008 | Russ |
| 7,419,357 B2 | 9/2008 | Nohr et al. |
| 2006/0263220 A1 | 11/2006 | Russ |
| 2007/0237640 A1 | 10/2007 | Russ |

FOREIGN PATENT DOCUMENTS

| | | |
|---|---|---|
| EP | 0713008 B1 | 1/2000 |
| EP | 2199205 A2 | 6/2010 |
| EP | 2399829 A2 | 12/2011 |
| GB | 2072271 A | 9/1981 |
| WO | 8501326 A1 | 3/1985 |
| WO | 8604385 A1 | 7/1986 |
| WO | 9316917 A1 | 9/1993 |
| WO | 2005058703 A1 | 6/2005 |

OTHER PUBLICATIONS

International Search Report; International Application No. GB1120723.1; International Filing Date Mar. 30, 2012; Date of Mailing; 4 pages.

* cited by examiner

TURBINE YOKEPLATE FLYWEIGHTS TO IMPROVE RAT STARTUP

BACKGROUND OF THE INVENTION

The subject matter disclosed herein relates to turbine yokeplate flyweights to improve RAT startup.

A Ram Air Turbine (RAT) is controlled by a governing mechanism to maintain a narrow operating speed range. The governor spring and blade aerodynamic forces rotate the blades toward fine pitch orientations at which substantially rapid rotation occurs with blade faces oriented substantially perpendicularly with respect to the airstream. Blade counterweights rotate the blade toward coarse pitch to prevent over speed conditions. The various forces of the governor spring, the blade aerodynamics and the blade counterweights balance each other to maintain the proper speed range but the counterweights require centrifugal forces to develop their restraining forces.

During startup, centrifugal forces are low, so the RAT governor is typically controlled by the governor springs with the blades in the fine pitch position. The airfoil shape is optimized to give power over the operating speed range, so it is somewhat inefficient at low RPM and fine pitch and there is very little torque available to overcome the large blade inertia and the RAT tare losses at low RPMs. Indeed, even if the RAT starts to turn, it takes a long time for a fine pitch RAT to get up to operating speed. Moreover, RATs are sometimes placed in turbulent zones under the aircraft where the dynamic pressure loss is high. This further reduces the available torque for start up.

Both fine pitch and coarse pitch start up RATs are currently in production. The fine pitch architecture has proven superior for reliability, robustness, weight, cost and packaging. Coarse pitch RATs contain more heavy, complicated parts and more failure points, but they start up more efficiently.

BRIEF DESCRIPTION OF THE INVENTION

According to one aspect of the invention, a turbine having a cam follower operable to control turbine blade pitch in association with a position thereof is provided and includes an axially movable plate, a rotational and axially movable flyweight and a system operably coupled to the plate and the flyweight whereby, at low RPMs, the system prevents flyweight rotation such that the plate and the flyweight position the cam follower at a first position, at medium RPMs, the system permits flyweight rotation such that the plate and the flyweight position the cam follower at a second position, and, at high RPMs, the system prevents further flyweight rotation and permits initial axial movement of the plate and the flyweight such that the plate and the flyweight position the cam follower at a third position.

According to another aspect of the invention, a turbine having a cam follower operable to control turbine blade pitch in association with a position thereof is provided and includes a plate movable from an axial position, a flyweight rotatable between first and second rotational positions and movable from an axial position and a system operably coupled to the plate and the flyweight whereby: at low RPMs, the system prevents flyweight rotation from the first rotational position such that the plate and the flyweight position the cam follower at a first position, at medium RPMs, the system permits flyweight rotation to the second rotational position such that the plate and the flyweight position the cam follower at a second position, and, at high RPMs, the system prevents further flyweight rotation and permits axial movement of the plate and the flyweight from the respective axial positions such that the plate and the flyweight position the cam follower at a third position.

According to yet another aspect of the invention, a turbine having a cam follower operable to control turbine blade pitch in association with a position thereof is provided and includes a plate movable from an initial axial position, a flyweight rotatable between first and second rotational positions and movable from an initial axial position and a system operably coupled to the plate and the flyweight whereby: at low RPMs, the system prevents flyweight rotation from the first rotational position such that the plate and the flyweight position the cam follower at a first turbine blade pitch control position, at medium RPMs, the system permits flyweight rotation to the second rotational position such that the plate and the flyweight position the cam follower at a second turbine blade pitch control position, and, at high RPMs, the system prevents further flyweight rotation and permits axial movement of the plate and the flyweight from the respective initial axial positions such that the plate and the flyweight position the cam follower at a third turbine blade pitch control position.

According to yet another aspect of the invention, a turbine having a cam follower operable to control turbine blade pitch in association with a position thereof is provided and includes a plate movable in an axial direction within a turbine hub of the turbine, a flyweight rotatable about pivot pins, which are axially fixed within the turbine hub and a system operably coupled to the plate and the flyweight whereby, at low to medium RPMs, the plate is positioned neutrally with bias applied thereto and bias applied to the flyweight being substantially similar such that the plate and the flyweight position the cam follower at a first turbine blade pitch control position, at medium RPMs, greater net load is applied to the plate and the plate is axially moved toward a stop such that the plate and the flyweight position the cam follower at a second turbine blade pitch control position, and, at medium to high RPMs, axial movement of the plate is prevented and bias applied to the flyweight increases such that the plate and the flyweight position the cam follower at a third turbine blade pitch control position.

These and other advantages and features will become more apparent from the following description taken in conjunction with the drawings.

BRIEF DESCRIPTION OF THE DRAWING

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

In accordance with aspects of the invention, a fine pitch ram air turbine (RAT) construction is provided with enhancements needed to make an RAT startup process more efficient even under adverse conditions. These enhancements include a coarse pitch start mechanism that rotates the blades to a mid-range pitch only during startup to thereby provide the additional torque needed to aid startup.

Figure 1:
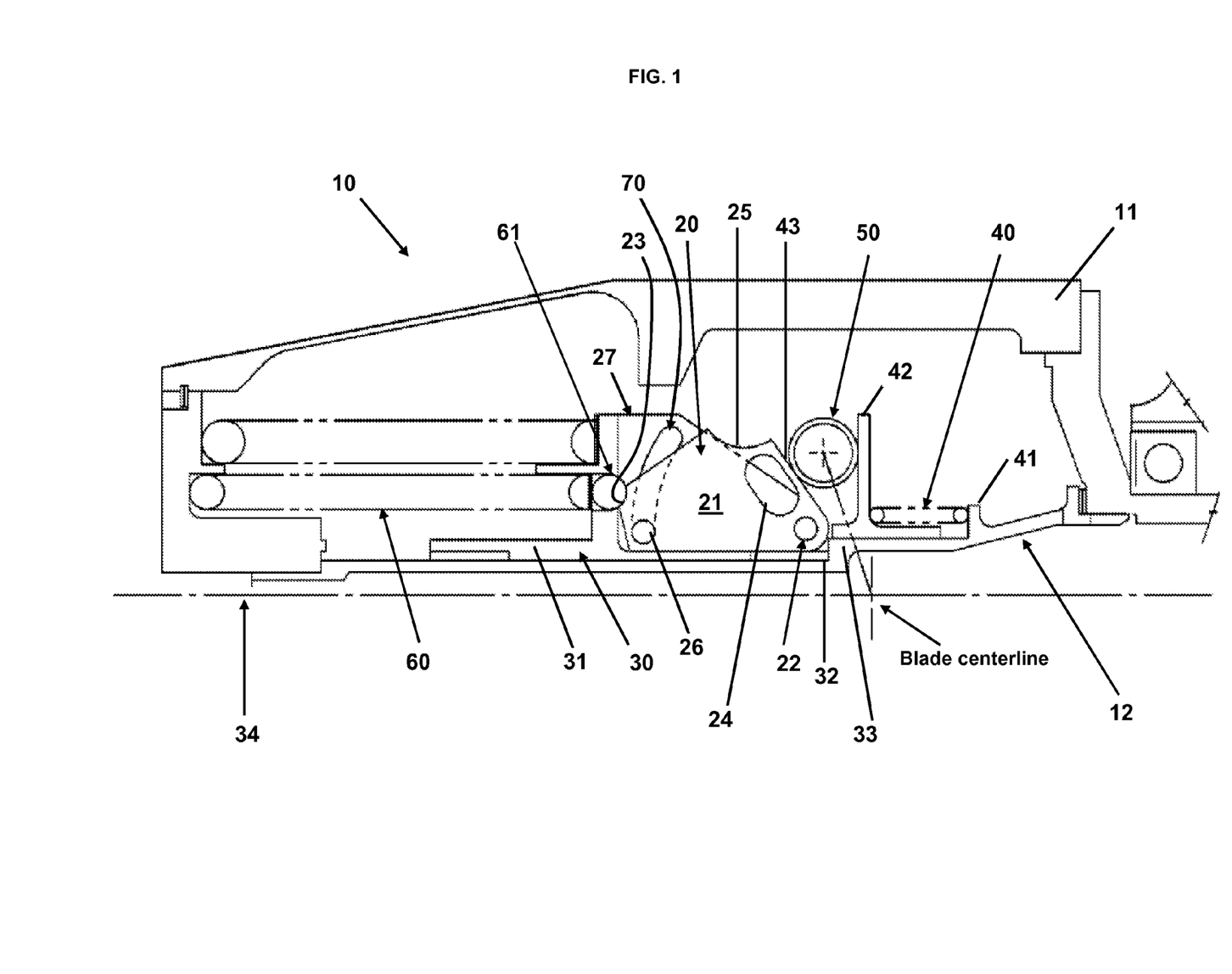
FIG. 1 is a side sectional view of an RAT at a low RPM start position.

A partial cross-section of an RAT 10 is shown in FIG. 1 and is similar to a typical fine pitch startup turbine but has been modified to start up at a blade angle that is coarser than normal to develop higher torque at low RPMs. In a typical fine pitch startup turbine, a yokeplate acts as a single body that shifts along a governor shaft as a cam follower changes position. In accordance with embodiments of the present invention, however, and with reference to FIG. 1, a flyweight 20 has been added to a yokeplate 30 and is configured to have an adjustable position based on the starting turbine speed.

To this end, the flyweight 20 includes a flyweight body 21 that is rotatable away from a plane of the yokeplate 30 about a flyweight pivot axle 22. The flyweight body 21 is formed to define a detent pocket 23 as well as an elongate through-hole 24 and a recessed corner section 25 that reduce an overall weight of the flyweight 20. The flyweight body 21 also includes a surface to which a boss 26 is integrally coupled. Movement of the boss 26 as the flyweight 20 rotates is guided by a rotational guide 27 having a guide slot defined therein.

The RAT 10 is generally formed of a turbine casing 11 having a governor shaft 12 proximate to a turbine rotational axis 34. Along with the other components described herein, the yokeplate 30 is disposed within the turbine casing 11 and includes a yokeplate body 31 that is axially movable with respect to the turbine casing 11 along the governor shaft 12 as RPMs increase and decrease. At the low RPM start position shown in FIG. 1, the yokeplate 30 is in the normal fine pitch axial position whereby an end 32 of the yokeplate body 31 is proximate to turbine casing shoulder 33 but the flyweight 20 is rotationally positioned close to the turbine rotational axis 34.

A flyweight spring 40 is anchored to a protrusion 41 of the turbine casing 11 and to a plate member 42, which is axially movable with respect to the turbine casing 11. The flyweight spring 40 thereby biases a cam follower 50 and turbine blades, which are operably coupled to the cam follower 50 for turbine blade pitch positional control, into a mid range startup position with the cam follower 50 abutting against a surface 43 of the flyweight 20. The surface 43 approaches and recedes from the plate member 42 as the flyweight 20 rotates with the cam follower 50 disposed between the plate member 42 and the surface 43 such that the cam follower 50 is biased to move in accordance with the flyweight 20 rotation.

The RAT 10 further includes a governor spring 60 having a detent 61 at an end thereof. The detent pocket 23 defined by the flyweight body 21 registers with the detent 61 such that the flyweight 20 can be held in the start position of FIG. 1 by the governor spring 60.

Figure 2:
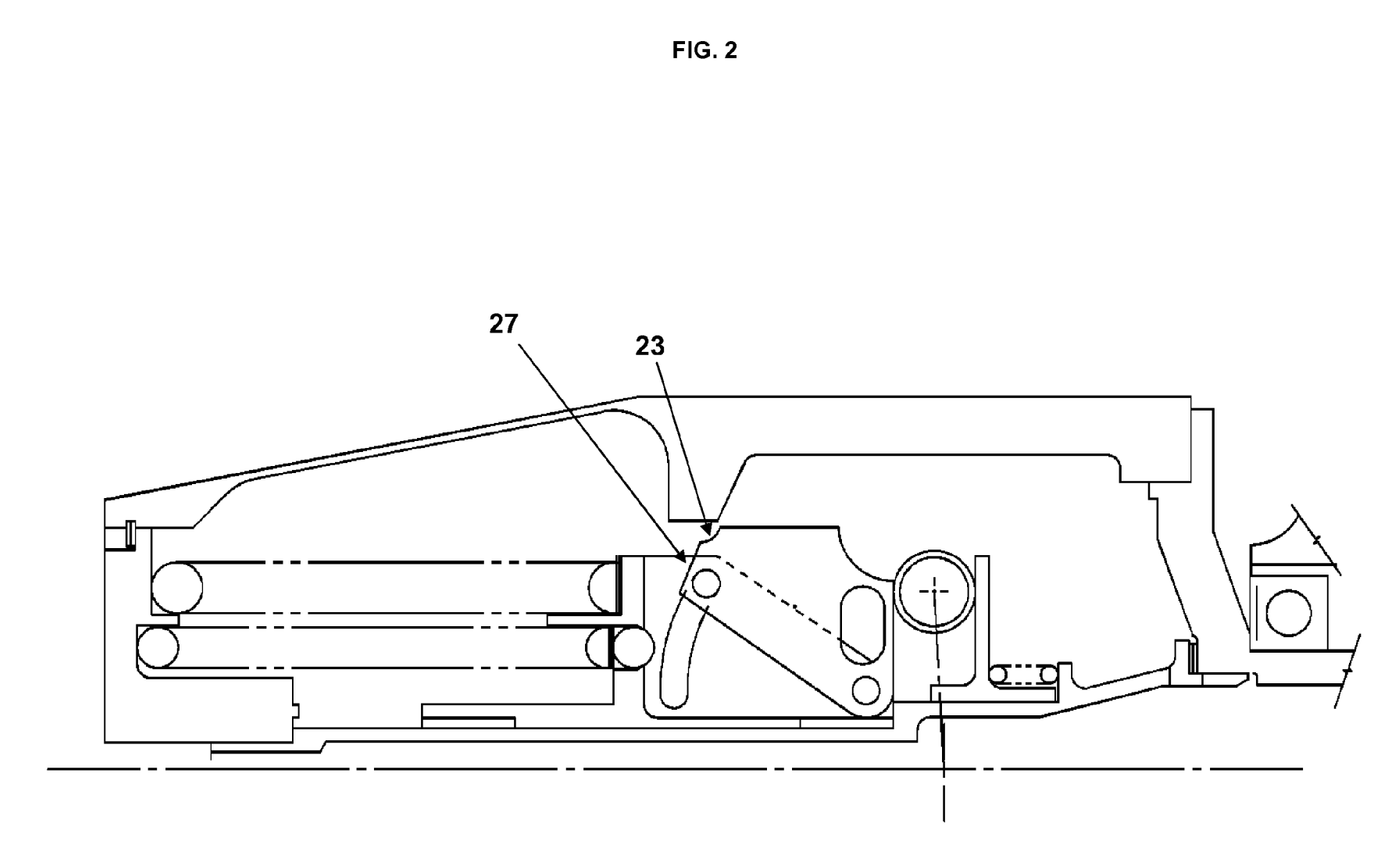
FIG. 2 is a side sectional view of the RAT of FIG. 1 with a fine pitch governing position.

With reference to FIG. 2, at low RPMs, the flyweight spring 40 and the cooperation between the detent 61 and the detent pocket 23 cooperatively supply enough load to hold the flyweight 20 and the cam follower 50 in the start position. When the turbine reaches a transition point, however, centrifugal forces on the flyweight 20 balance the flyweight spring 40, blade, counterweight and detent forces. At slightly higher RPMs, the flyweight 20 centrifugal force increases faster than the opposing blade and counterweight forces increase, so the flyweight 20 moves outward toward the FIG. 2 position. If one of the flyweights 20 moves out prior to the other flyweights 20, the flyweight spring 40 load is removed from the lagging flyweights 20 to thereby allow them to also rotate outward.

Figure 3:
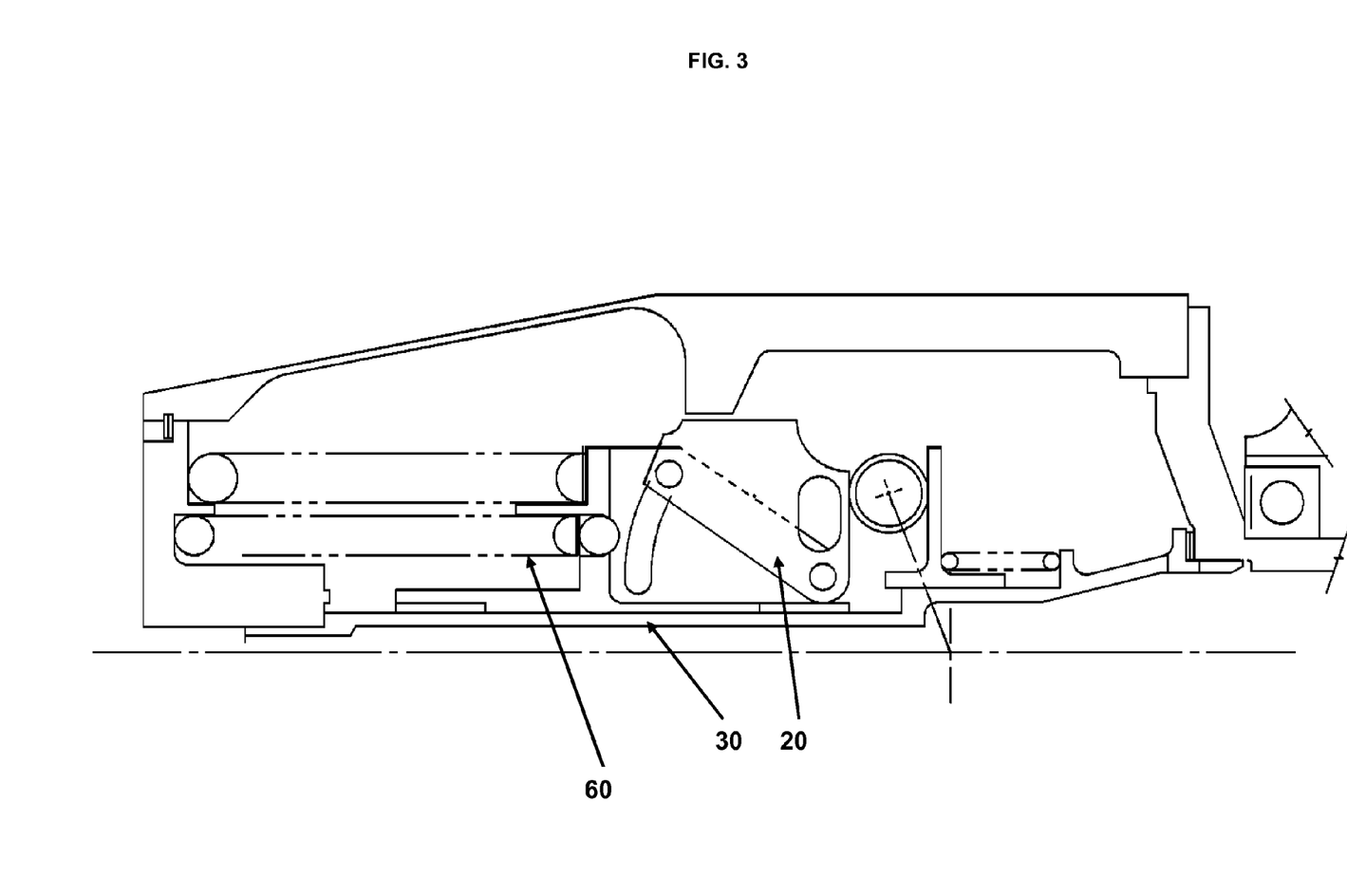
FIG. 3 illustrate a typical governing position.

Still referring to FIG. 2 and with additional reference to FIG. 3, with the rotation of the flyweight 20 and the corresponding movement of the cam follower 50, the blade(s) coupled to the cam follower(s) 50 now occupy a fine pitch position for the start of normal RAT 10 governing. A stop 70 at an end of the guide slot of the rotational guide 27 stops the boss 26 and the flyweight 20 from continuing to rotate and so prevents over rotation. As such, the yokeplate 30 and the flyweight 20 now act as a single body during normal governing and, at higher RPMs in the normal governing range, the yokeplate 30 and the flyweight 20 are caused to axially move or shift (i.e., the yokeplate 30 and the flyweight 20 move to the left in the image of FIG. 2) against the governor spring 60, as shown in FIG. 3.

As the yokeplate 30 moves in this manner (i.e., to the left), the cam follower 50 moves closer to the flyweight pivot axle 22. A moment arm is thereby reduced to help prevent cam follower 50 forces from overcoming centrifugal forces exerted on the flyweight 20 and turbine blade counterweight forces increase at a mid range blade angle such that there is more cam follower 50 load at a shorter moment arm. The flyweight 20 mass is chosen to maintain the FIG. 2 position against cam follower 50 loads throughout the governing range.

The mechanism described herein with reference to FIGS. 1-3, automatically resets from the FIG. 3 and FIG. 2 positions back to the FIG. 1 position when the RAT 10 RPM is decreased. The detent pocket 23 registers with the detent 61 and the rotational guide 27 is ramped to ease detent 61/detent pocket 23 re-registry when the RAT 10 slows to a rest. That is, as the flyweight 20 rotates back to the startup position of FIG. 1, the boss 26 slides through the guide slot of the rotational guide 27 until the detent 61 moves back into the detent pocket 23. The flyweight spring 40 is sized large enough to overcome any friction forces between the flyweight(s) 20 and the detent(s) 61 during the resetting.

Figure 4:
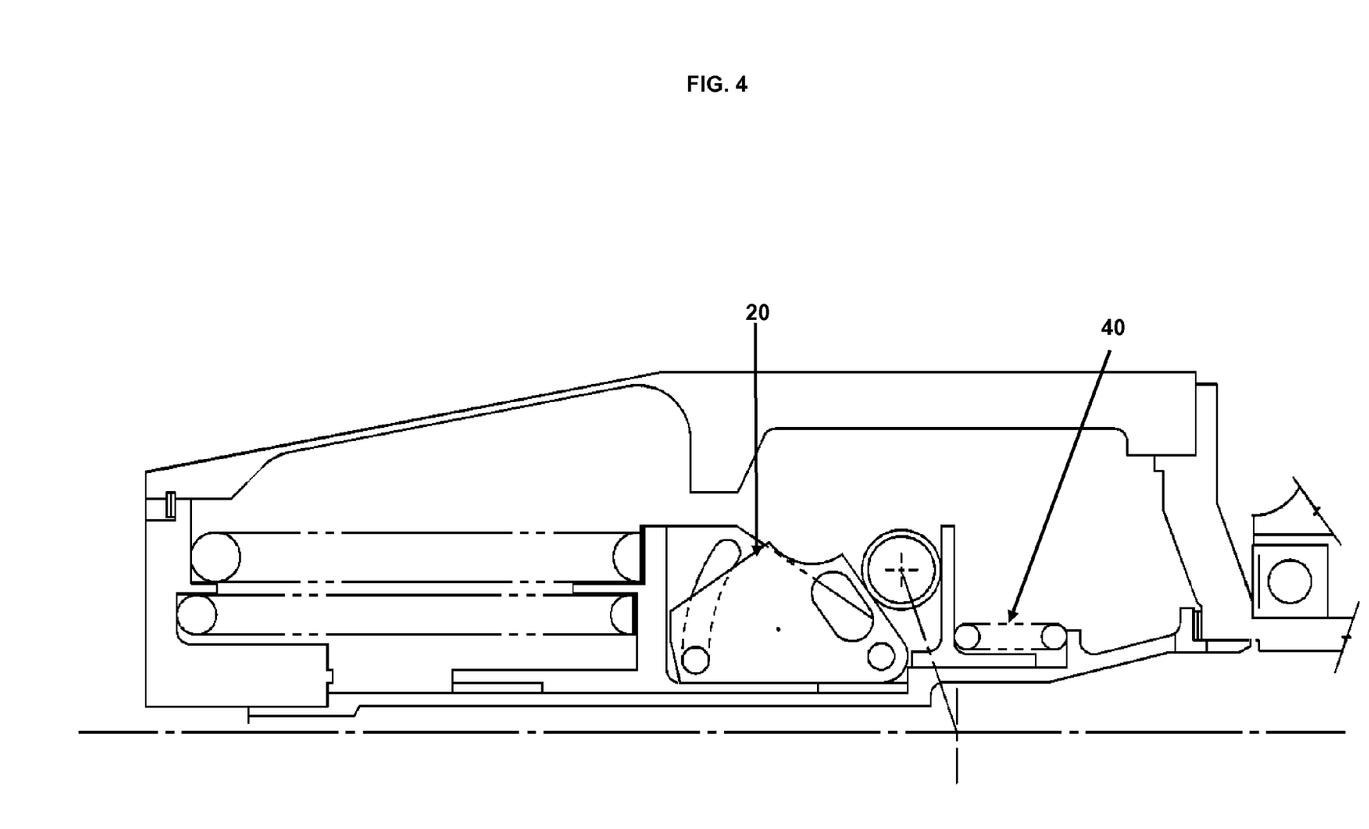
FIG. 4 illustrates an alternate embodiment.

With reference to FIG. 4, an alternate embodiment is shown. Here, the detent 61 is removed and the flyweight 40 spring is designed to supply a higher load to prevent early transition to fine pitch position and the counterweight of the flyweight 20 needs to be more massive to overcome the heavier flyweight spring 40 in the governing range. The governor spring(s) 60 also need to be stronger to overcome the heavier flyweight spring 40. All of these changes are feasible with only small adjustments to the envelope. The flyweight 20 mechanism operates in a similar manner to the version described above.

Figure 5:
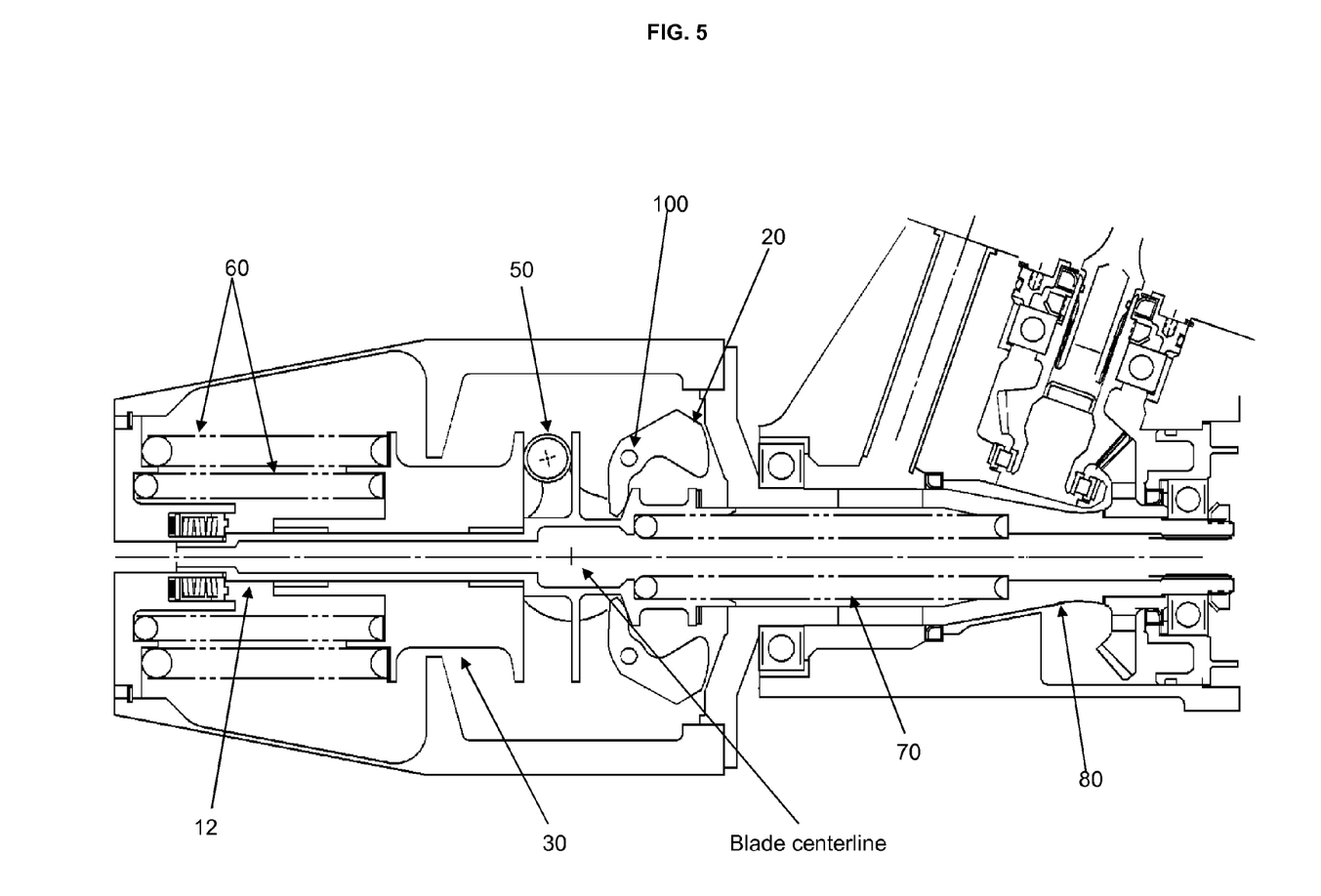
FIGS. 5 and 6 show a side sectional view of an Rat in accordance further embodiments of the invention.
Figure 6:
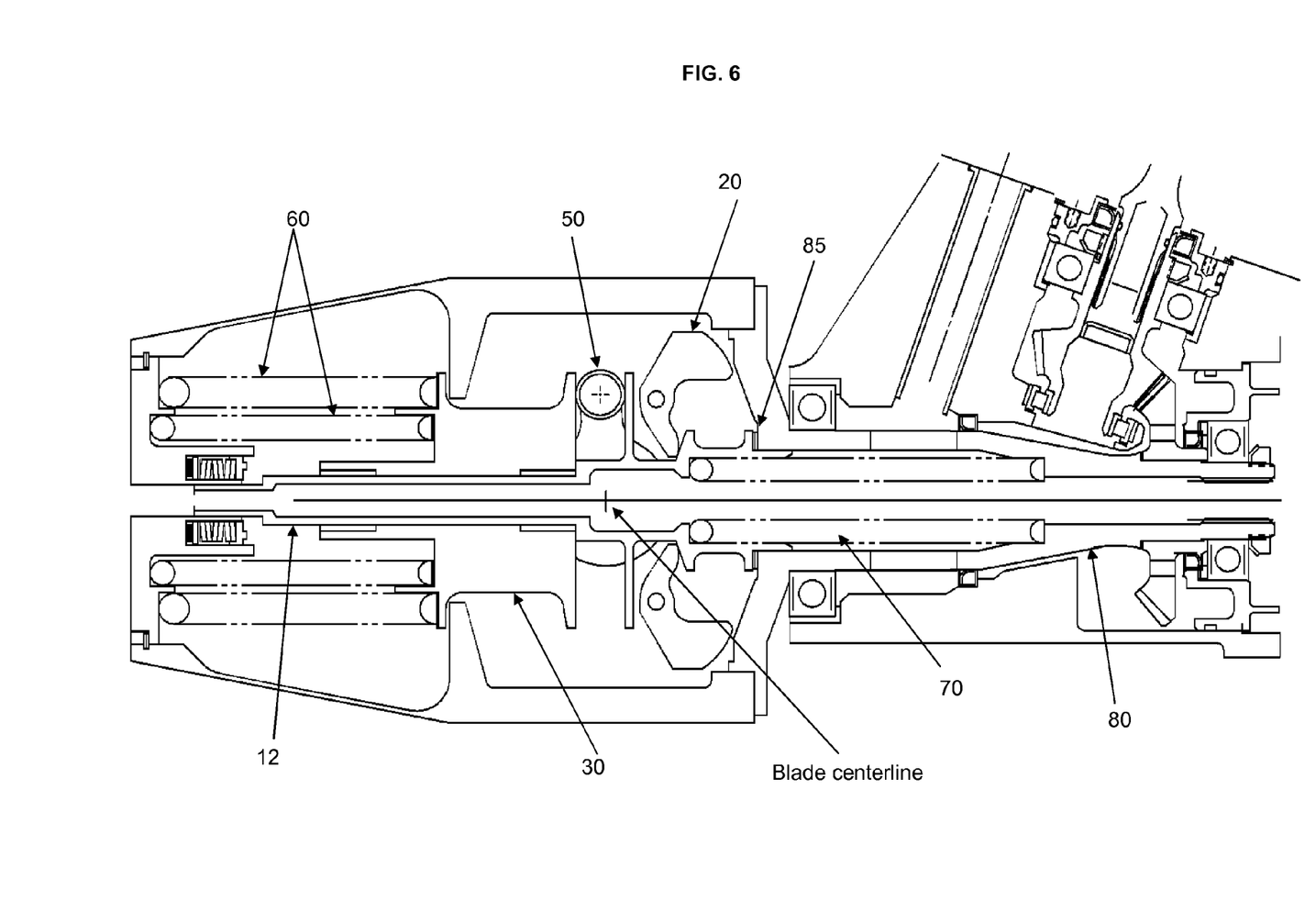
Figure 7:
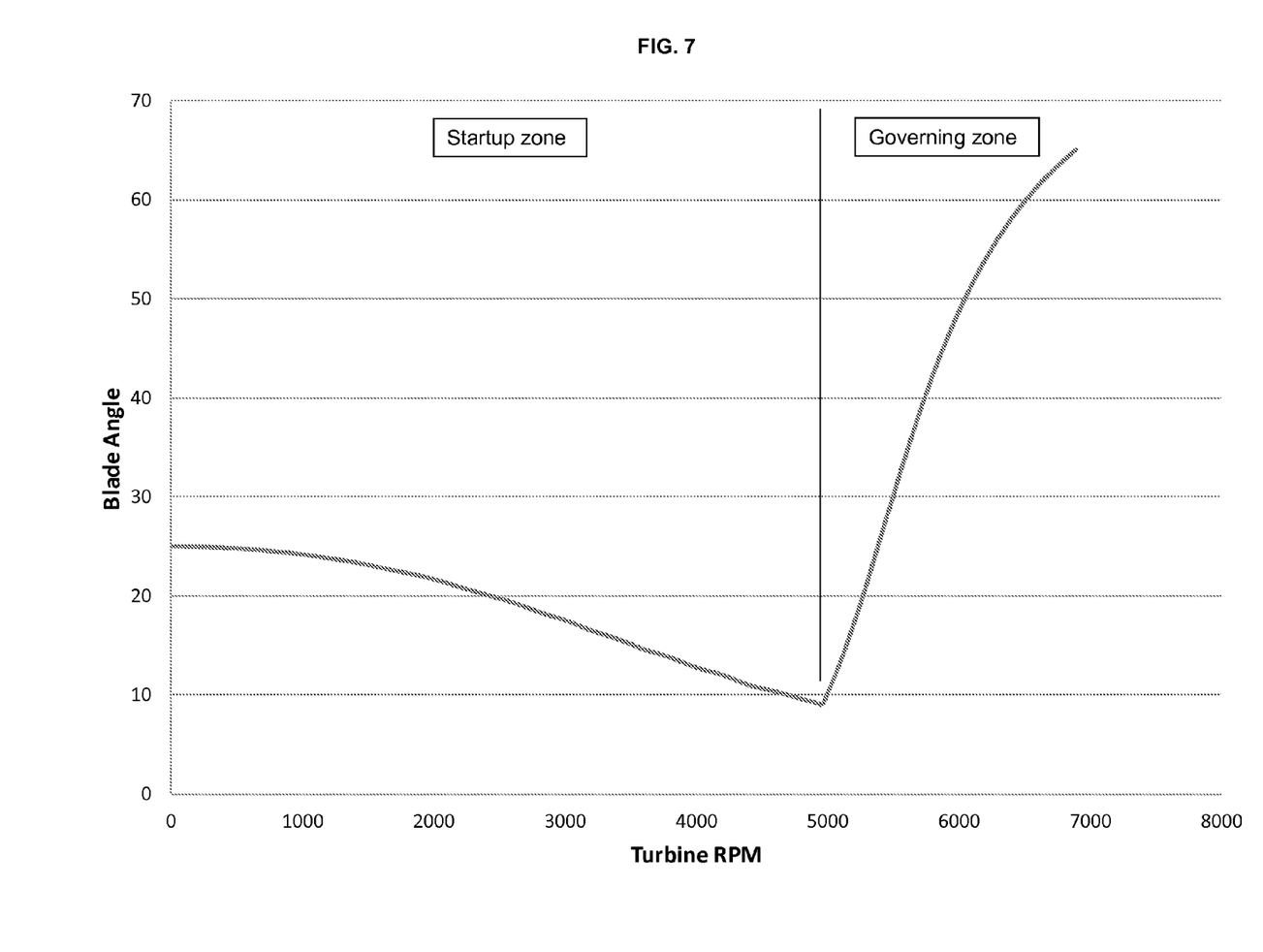
FIG. 7 is a graphical display of blade angles vs. RAT RPMs for the RATs of FIGS. 5 and 6.

In accordance with further aspects of the invention and, with reference to FIGS. 5-7, an RAT 10 includes a strong flyweight spring 70, which is disposed inside the turbine driveshaft 80, and which opposes the governor springs 60 at start up. The governor shaft 12 and the yokeplate 30 are positioned at a neutral point where the load provided by the governor spring 60 is substantially equal to the load provided by the flyweight spring 70. This positions the cam follower 50 and the turbine blades at a mid-range angle, which allows the blades to develop more starting torque.

As the RAT 10 begins to spin, the turbine blades and counterweight forces apply a load toward the governor spring 60 and the flyweights 20 provide a larger load in the opposite direction. At each speed, an equilibrium point is reached between all these forces to locate the blade angle. A representative blade angle vs. RPM plot is shown in FIG. 7. As the RAT 10 speeds up, the counterweight provides greater net load to the governor shaft 12 to gradually shift the blades to a finer angle. When normal governing speed is reached, the governor shaft 12 has shifted to the right until it rests on a stop.

Higher RAT 10 speeds within the governing range increase the flyweight 20 load, but the governor shaft 12 no longer shifts any further. Meanwhile, the yokeplate 30 is free to move to the left in the normal governing mode. All normal governing operation occurs with the governor shaft 12 firmly seated on the stop 85 as shown in FIG. 6.

The angle required for a turbine blade to produce the maximum torque is near coarse pitch at very low RPMs. The angle becomes finer with increasing RPMs. The blade angles shown in FIG. 7 allow the RAT 10 to start up at a favorable torque producing angle, and adjust that angle as the RAT 10 speeds up to maintain favorable torque capacity at all RPMs. In accordance with aspects of the invention, a RAT 10 may start up much quicker than the previous fine pitch start up turbines. It would be comparable to typical coarse pitch start up turbines up to about 1000 to 2000 RPM, where other coarse pitch turbines would quickly transition to fine pitch for less rapid acceleration. The gradual transition of this mechanism promotes a faster start up from about 1000 to 2000 RPM to the governing range.

When the RAT 10 slows down and comes to a rest after operation, the flyweight spring 70 automatically pushes the governor shaft 12 back to the left until an equilibrium position is reached with the governor spring 60. This resets the blades in the mid-range startup position shown in FIG. 1.

The flyweight 20 rotates about pivot pins 100, as shown in FIGS. 1 and 2. The pins 100 are held stationary by a yoke connected either to the turbine hub or the turbine driveshaft (not shown). Motion from the counterweights is transferred to the governor shaft 12 through a rack and pinion type of connection. Only 1 tooth of the rack and 1 tooth of the pinion is shown, but a second tooth could be added to both for smoother load transmission. Other types of load transfer devices could be used, such as a cam follower pushing against the governor shaft.

The flyweight spring 70 shown is a helical compression spring, which fits comfortably within the turbine driveshaft shown. A larger diameter turbine driveshaft 80 would allow a stack of disk springs to be substituted, if desired, for a modest weight savings.

In accordance with aspects of the present invention, additional weight increase from the fine pitch version is limited by the addition of moderately sized flyweights with a small increase in overall length. Also, automatic reset to the start position when the RAT 10 slows to a stationary position is possible with simple component parts that do not add much complexity to the traditional turbine design. Further, the flyweight(s) 20 are supported with a small amount of additional material and flyweight 20 centrifugal loads do not require a stronger hub to support them while compliance is added to the yokeplate 30, which may reduce impact loading into the coarse pitch stop. Still further, whereas current design requires a spring pack to blunt impact loading, an existing governor spring 60 can be used as the detent 61 o minimize the size of the flyweights 20 and the flyweight spring 40.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A turbine having a cam follower operable to control turbine blade pitch in association with a position thereof, the turbine comprising:
   a turbine casing including a turbine hub and a drive shaft, and the drive shaft including a stop;
   a plate movable in an axial direction within the turbine hub of the turbine;
   a flyweight rotatable about pivot pins, which are axially fixed within the turbine hub; and
   a system operably coupled to the plate and the flyweight whereby:
   at low to medium RPMs, the plate is positioned neutrally with bias applied thereto and bias applied to the flyweight being substantially similar such that the plate and the flyweight position the cam follower at a first turbine blade pitch control position,
   at medium RPMs, greater net load is applied to the plate and the plate is axially moved toward the stop such that the plate and the flyweight position the cam follower at a second turbine blade pitch control position, and,
   at medium to high RPMs, axial movement of the plate is prevented and bias applied to the flyweight increases such that the plate and the flyweight position the cam follower at a third turbine blade pitch control position.

2. The turbine according to claim 1, further comprising:
   a governor spring to bias the plate; and
   a flyweight spring to bias the flyweight in opposition to the governor spring bias.

* * * * *